United States Patent [19]

Shirato

[11] 3,849,767

[45] Nov. 19, 1974

[54] MEMORY CIRCUIT

[75] Inventor: Hajime Shirato, Tokyo, Japan

[73] Assignee: Nippon Electric Company, Limited, Tokyo, Japan

[22] Filed: Oct. 23, 1973

[21] Appl. No.: 408,578

[52] U.S. Cl. .................... 340/173 DR, 340/173 R
[51] Int. Cl. .................... G11c 11/40
[58] Field of Search .................... 340/173 R, 173 DR

[56] References Cited

UNITED STATES PATENTS 3,796,998 3/1974 Appelt .................... 340/173 DR

*Primary Examiner*—Terrell W. Fears
*Attorney, Agent, or Firm*—Sandoe, Hopgood & Calimafde

[57] ABSTRACT

A semiconductor memory including a matrix array of storage cells employs read and write word lines oriented along one matrix axis, and common digit lines disposed about the other matrix axis. Each storage cell comprises three interconnected read, write and information retaining insulated gate field effect transistors, information being preserved via stray capacitance at the gate of the information preserving transistor.

In accordance with varying aspects of the present invention, information is read out from each storage cell in the same polarity as it is stored therein, and each memory cell is refreshed in phase, thus permitting overall system simplifications. In addition, information refreshing and input/output gating circuitry is employed.

5 Claims, 7 Drawing Figures

MEMORY CIRCUIT

The present invention relates to a memory circuits, and more specifically, to a memory employing insulated gate field-effect transistors (hereinafter referred to as "IGFET's"). More particularly, the invention relates to a 3.5-line type memory cell comprising three transistors, viz., "read" transistor, a "write" transistor and an information retaining transistor, and to an information level refreshing circuit to be used with such memory cells.

A conventional three .5-line type 3-transistor memory cell is formed by connecting the gate, source, and drain terminals of the "read" transistor to a "read" word line, to a common digit line, and to the drain of the information retaining transistor respectively. The gate, source, and drain terminals of the "write" transistor are connected to a "write" word line, to the gate of the information retaining transistor, and to the common digit line, respectively. The source terminal of the information retaining transistor is connected to the lowest potential of the circuit (usually, ground), where N-channel IGFET's are used as transistors. The common digit line is connected to the highest potential of the circuit through a switch, for this conventional memory case. The memory cell stores an information by accumulating electric charge in stray capacitance which exists at the gate of the information retaining transistor.

In operation, the switch connected to the common digit line is first turned on to precharge the common digit line to a high potential (high level), and then turned off to isolate the precharged common digit line from the power supply of high potential. A "read" command signal is then applied to the "read" word line, to turn the "read" transistor on and to read out the stored information of the memory cell to the common digit line. More specifically, if the stored information at the gate of the information retaining transistor is at a high level, this transistor is in the "on" state, and consequently, the high level potential of the precharged common digit line is discharged through both the "read" transistor and the information retaining transistor to the low potential state. On the other hand, if the stored information of the information retaining transistor is at a low level, this transistor is in the "off" state, and hence, the high level potential is retained at the common digit line. In this manner, an information digit opposite to that stored in the memory cell is read out of the common digit line.

As previously stated, the memory cell stores information by accumulating charge in the gate stray capacitor of the information retaining transistor. Therefore, this type of memory cell loses its stored information with passage of time because charge leaks from the stray capacitance. It is accordingly necessary to rewrite or refresh the memory cell to prevent the stored information from being lost. For this purpose, a "write" command signal is supplied to the "write" word line to turn the "write" transistor on, with the result that the inverted information read out to the common digit line is written into the capacitor at the gate of the information retaining transistor. More specifically when the gate of the information retaining transistor is at the high level, the common digit line is at the low level, and hence the charge in the gate capacitance of the information retaining transistor is transferred into the common digit line through the "write" transistor. Since, in this case, the capacitance of the common digit line is far larger than the gate capacitance of the information retaining transistor, the gate of the information retaining transistor falls to the low level. On the other hand, when the gate of the information retaining transistor is at the low level, the common digit line is at the high level, so that charge is transferred from the common digit line through the "write" transistor into the gate capacitor of the information retaining transistor, to bring the gate of the information retaining transistor to the high level. In this way, inverted information is written into memory cells by the refreshing operation.

The reason why the mentioned memory cell is termed the 3.5-line type is that control lines for each memory cell consist of the three lines, i.e., the "read" word line, the "write" word line and the common digit line to which the "read" and "write" digit lines are commonly connected and a ground line per two memory cells which is connected to the source of the information retaining transistor.

As has been described, in the 3.5-line type 3-transistor memory cell, inverted information is read out to the common digit line, and inverted information is written during refreshing. In order to operate a memory circuit employing the memory cells, circuit contrivances are, therefore, to account for these signal polarity inversions, a high degree of technique is required, and a complicated circuit arrangement is unavoidable.

Furthermore, since inverted information is written at every refresh cycle, the "write" command signal cannot be at the low level before the refreshing operation is fully completed. That is, since there is a possibility of destroying the stored information if the refreshing operation is interrupted by an access signal from a central processing unit (CPU) which the inverted information is being written, access command cannot occur before refreshing execution terminates.

In addition, since the stored information of the memory cell and the information read out to the digit line are in a logically complementary relation, it is impossible for the "read" command signal and the "write" command signal to both at the high level. That is, it is required that after an operation signalled by the "read" command signal has been completed and the "read" command signal becomes low the "write" command signal transitions to the high level. Therefore, it is necessary to add a circuit which detects the "read" command signal transition to the low level and responsive thereto, sets the "write" command signal to the high level. In addition, the on-off operation of the "read" and "write" command signals within a cycle of memory operation generates associated noise resulting in improper operations of a memory circuit.

An object of the present invention is, therefore, to provide a 3.5-line type three transistor memory cell circuit in which information characterizing a digit line is logically in phase with stored cell information.

Another object of the present invention is to provide a circuit for rewriting an inphase information is stored.

The construction of a memory cell employed in the memory circuit of the present invention is somewhat the same as that of the prior-art memory cell. However, the memory cell according to the instant invention is characterized in that, where N-channel IGFET's are employed, the source of information retaining transistor is connected to the high potential of a power supply (where P-channel IGFET's are used, its source is connected to the low potential of the power supply), and that the low potential of the power supply, for example, ground potential (in case of the P-channel IGFET, the high potential of the power supply) is used as the precharge voltage of the common digit line.

In accordance with the memory circuit of the present invention, in a "read" operation, when the gate of the information retaining transistor of the memory cell is at a high level, the information retaining transistor is "on." Accordingly, the common digit line having been precharged to a low level is connected through the "read" transistor and the information retaining transistor to the high potential output of the power supply, and high level information is read out to the common digit line. In contrast, when the gate of the information retaining transistor is at the low level, the information retaining transistor if "off," and hence, the common digit line remains at the low level. That is, information in phase with the stored information of the memory cell is read out to the common digit line. Also, during refreshing, the information is rewritten in phase.

Specific illustrative embodiments of the present invention will now be described in detail with reference to the accompanying drawings, in which.

In the following description, it is assumed that all IGFET's employed are N-channel MOS transistors. As a mere matter of course, however, P-channel MOS transistors can also be used by modifying the polarity relations of each potential.

An N-channel MOS transistor is constructed such that an N-type impurity is diffused or introduced into a semiconductor substrate by the ion-implantation at selected portions of the substrate, thus forming N-type source and drain regions. A a gate electrode is formed on an insulating layer coating the surface of the substrate between regions. By applying a positive high potential to the gate electrode, an N-channel is induced between the source and drain regions of the substrate, and the source and drain are then electrically connected for conduction therebetween. Correspondingly a "P-channel MOS transistor" has P-type source and drain regions formed in an N-type semiconductor substrate. A negative high potential is applied to the gate electrode, whereby the source and drain are electrically connected.

Figure 1:
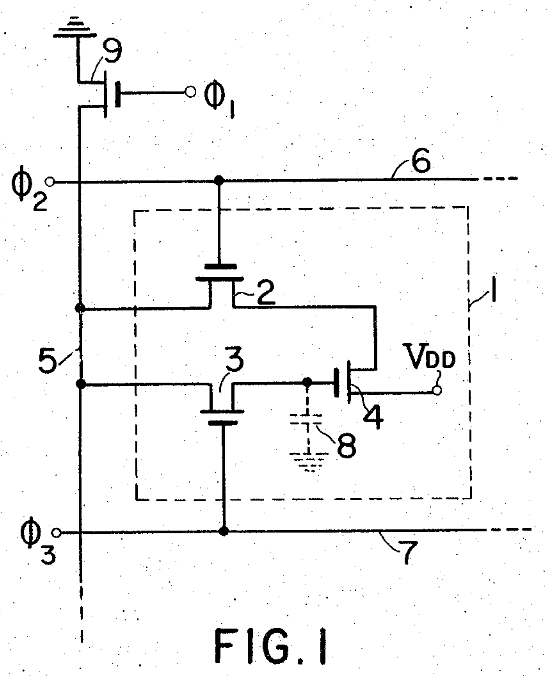
FIG. 1 is a circuit diagram of an embodiment of the present invention.

Referring to FIG. 1, a memory cell 1 comprises a "read" transistor 2, a "write" transistor 3 and an information retaining transistor 4. The output terminal of the "read" transistor 2 and the input terminal of the "write" transistor 3 are connected to a common digit line 5. The "read" transistor 2 has its input terminal connected to the source of the information retaining transistor 4, and has the gate thereof connected to a "read" word line 6. The "write" transistor 3 has its output terminal connected to the gate of the information retaining transistor 4, and has the gate thereof connected to a "write" word line 7. The drain of the information retaining transistor 4 is supplied with a high voltage $V_{DD}$ volts of a power supply, so that the transistor 4 operates as a source follower.

In the memory cell, information is stored via electric charge in stray capacitance 8 at the gate terminal of the information retaining transistor 4. The constituents of the 3.5 lines in this memory cell 1 are the "read" word line 6, the "write" word line 7, the common digit line 5, and one line of the high potential of the power supply for two memory cells. The common digit line 5 is connected to the drain of a switching transistor 9, while the source of the transistor 9 is connected to the low potential side of the power supply (the ground or 0 volt in this case). Accordingly, the digit line 5 is reset to a low potential by a reset pulse $\phi$ 1 supplied to the gate of the transistor 9.

The operation of the memory cell 1 will now be described with reference to the timing waveform shown in FIG. 2. Before a time $t_{10}$, the reset pulse $\phi$ 1 is at the high level, a "read" command signal $\phi$ 2 to be applied to the "read" word line 6 is low, and a "write" command signal $\phi$ 3 applied to the "write" word line 7 is also at the low level. Consequently, the transistor 9 is in the conductive state, and the digit line 5 has its potential brought into the low level through the transistor 9 to be reset. At the time $t_{10}$, the reset pulse $\phi$ 1 becomes low and turns the transistor 9 off, while the "read" command signal $\phi$ 2 becomes high to select the "read" word line 6 and to thereby turn the "read" transistor 2 on. If high level information is stored in the capacitor 8 at this time, the information retaining transistor 4 is "on," and hence, the high potential $V_{DD}$ of the power supply is supplied through the transistors 2 and 4 to the common digit line 5. As a result, the common digit line 5 exhibits the high level potential.

If, on the other hand, low level information is stored in the capacitor 8, the information retaining transistor 4 is "off," and hence, the comman digit line 5 remains at the low level. Thus, information in phase with the stored information context of the memory cell 1 appears at the common digit line 5 upon reading. At a time $t_{11}$ at which the information has been read out to the common digit line 5, the "write" command signal $\phi$ 3 increases to the high level, and the "write" word line 7 is selected. Thus, the "write" transistor 3 is rendered conductive, and the information on the digit line 5 (in phase with the stored information of the memory cell) is rewritten into the capacitor 8 of the memory cell. Since the information in phase with the information content of the memory cell must be rewritten at a sufficiently high level, the "write" command signal $\phi$ 3 should remain at the high level until the sufficiently high level is rewritten into the capacitor 8. Therefore, the "write" command signal $\phi$ 3 becomes low at a time $t_{12}$ after a sufficient period has elapsed such that the capacitor 8 is fully charged to its high level. Since the information in phase with that of the memory cell is stored in the digit line 5, the "read" signal $\phi$ 2 can also be high for the period from the time $t_{10}$ to the time $t_{12}$.

Figure 2:
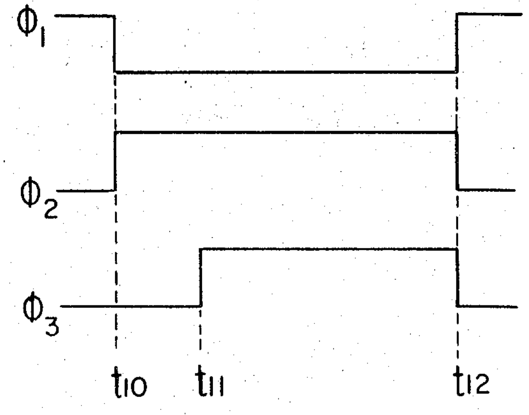
FIG. 2 is a timing waveform characterizing operation of the circuit of FIG. 1.

Although, in the illustration of FIG. 2, the low level transition of the reset pulse $\phi$ 1 occurs at the same time at the high level transition of the "read" signal $\phi$ 2, the high level transition of the "read" signal $\phi$ 2 may be effected after the reset pulse $\phi$ 1 becomes low. In the figure, the reset pulse $\phi$ 1 becomes high at the time $t_{12}$. In strict terms, however, it is required that after the "read" and "write" signals have become low level to perfectly complete the "read" and "write" operations, the reset pulse $\phi$ 1 is brought into its high level set to reset the common digit line 5.

Figure 3:
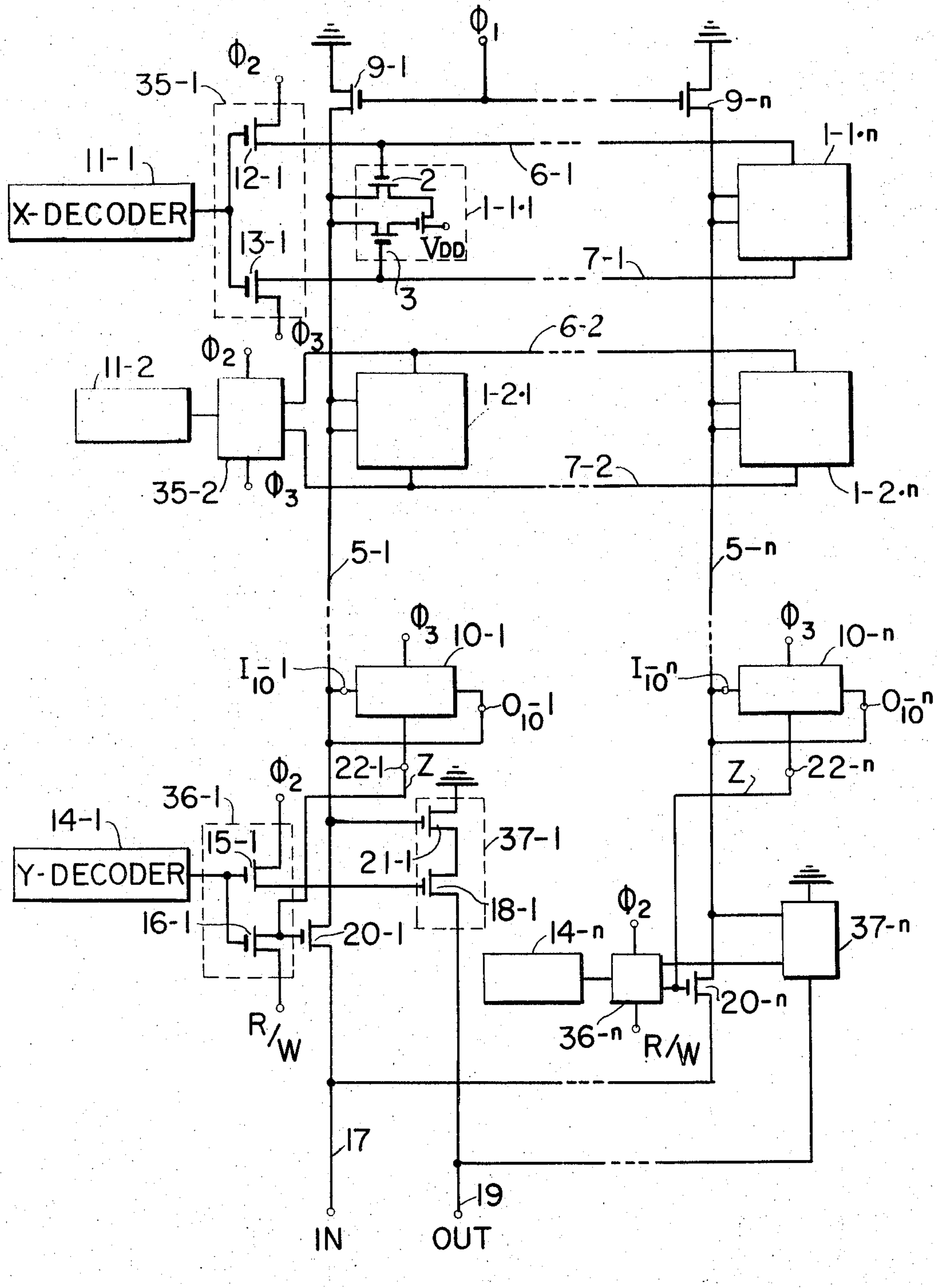
FIG. 3 is a diagram for describing the refreshing operation of a memory cell employing a level refreshing circuit for refreshing the information level of a common digit line connected to the memory cell.

Referring now to FIG. 3, there is illustrated the refreshing operation for the memory cell by employing a level refreshing circuit 10 for refreshing the information level of the common digit line 5. In the figure, the memory cells 1 are arranged to form a matrix of m-rows and n-columns, and the output of an X-decoder 11–*i* ($i$ = 1, 2, 3, . . . *m*) for selecting the "read" and "write" word lines 6–*i* and 7–*i* is connected to the gate of a "read" word line-selecting transistor 12–*i* and to the gate of a "write" word line-selecting transistor 13–*i*. These transistors 12–*i* and 13–*i* comprise a switching circuit 35–*i*.

The drain of the "read" word line-selecting transistor 12–*i* is connected to a to supply of the "read" signal $\phi$ 2, and the transistor source is connected to the "read" word line 6–*i*. The drain of the "write" word line-selecting transistor 13–*i* is connected to a supply of the "write" signal $\phi$ 3, and the transistor source is connected to the "write" word line 7–*i*. To the "read" word line 6–*i* and the "write" word line 7–*i*, there are respectively connected the gates of the "read" transistors 2 and the gates of the "write" transistors 3 of the respective memory cells 1–*i.n* belonging to disposed in i-th row of the memory matrix arranged cell array.

The common digit line 5–*j* ($j$ = 1, 2, . . . *n*) is connected to the drain of the switching transistor 9–*j* which is controlled by the reset pulse $\phi$ 1. The source of each transistor 9-j is connected to O volt (i.e., ground). Further, the output terminals of the "read" transistors 2 and the input terminals of the "write" transistors 3 of the respective memory cells 1–*m*·*j* in the j-th column of the memory cells matrix arranged are connected to the associated common digit line 5–*j*. Still further, to an extension of each common digit line 5–*j*, there is connected the input and output terminals $I_{10}$–*j* and $O_{10}$–*j* of a level refreshing circuit 10–*j* which is activated by the "write" signal $\phi$ 3. The information in phase with that stored in the memory cell appearing on the digit line 5–*j* is amplified by the level refreshing circuit 10–*j*.

The output of a Y-decoder 14–*j* for selecting the common digit line 5–*j* is connected to the gate of a transistor 15–*j* for selecting output information from a common digit line 5–*j*, and to the gate of a transistor 16–*j* for selecting the input information of the digit line 5–*j*. These transistors 15–*j* and 16–*j* form a switching circuit 36–*j*. The transistor 15–*j* has its drain connected to a supply of the "read" signal $\phi$ 2, and has the source thereof connected to the gate of a transistor 18–*j* whose source is connected to common output line 19. The drain of the transistor 16–*j* is connected to the gate of a transistor 20–*j* whose drain is connected to the digit line 5–*j* and whose source is connected to an input line 17. The drain of the transistor 16–*j* is also connected to the control terminal 22–*j* of the level refreshing circuit 10–*j*. The source of the transistor 16–*j* is connected to external read/write command signal-supplying means.

The drain of a transistor 18–*j* is connected to the drain of a transistor 21–*j* for deriving therefrom the information read out onto the digit line 5–*j*. These transistors 18–*j* and 21–*j* comprise an amplifier 37–*j*. The source and gate of the transistor 21–*j* are respectively connected to O volts (ground) and the digit line 5–*j*. The input line 17 and the output line 19 are connected in common for the respective matrix columns.

The level refreshing circuit 10 functions for its primary purpose to refresh the signal level in phase with the information of the memory cell 1 appearing on the digit line 5. However, should the level refreshing circuit 10 be active when new information from the input line 17 is being written, the problem arises that the new information and the output of the level refreshing circuit 10 interfere. A control signal applied to the control terminal 22 of the level refreshing circuit 10 is used to eliminate this problem. The control signal Z of the control terminal 22 is given in the form of the logical product between the output of the associated Y-decoder 14 and the R/W (read/write) signal. Therefore, when the signal Z is at the high level, it render the level refreshing circuit 10 inactive, even where the "write" signal $\phi$ 3 is high. More specifically, in an illustrative case where the X-decoder 11–1 and the Y-decoder 14–1 are selected, the information of the selected memory cell 1–1.1 is read out to the digit line 5–1 by the "read" signal $\phi$ 2. Since the transistors 15–1 and 18–1 included in the switching circuits 36–1 and 37-l become conductive at this time, the information read out to the digit line 5–1 is power-amplified by the amplifier 37–1 and is impressed on the output line 19. Subsequently, when the R/W signal becomes high during the high level period of the "write" signal $\phi$ 3, the level refreshing circuit 10–1 is rendered inactive by the input signal Z to the control terminal 22–1. The transistor 20–1 becomes conductive at this time, so that the external input information supplied to the input line 17 is rewritten through the common digit line 5–1 into the memory cell 1–1.1. However, when the R/W signal is at its low level in the period during which the "write" signal $\phi$ 3 is at the high level, or where Y-decoder 14–1 is not yet selected, no signal is supplied to the control terminal 22–1 of the level refreshing circuit 10–1. Hence, the level refreshing circuit 10–1 is activated by the "write" signal $\phi$ 3. Accordingly, the information read out to the digit line 5–1 is amplified by the level refreshing circuit 10–1, and is fed to the common digit line 5–1. Since the "write" transistor 3 of the memory cell 1–1.1 is "on" at this time, the information in phase with the stored information is rewritten into the memory cell 1–1.1 to be refreshed.

Figure 4:
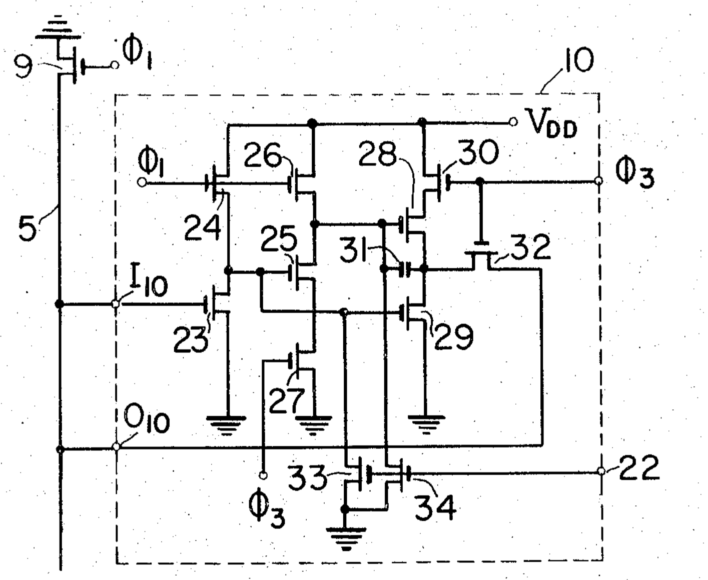
FIG. 4 is a circuit diagram showing a specific example of a level refreshing circuit.

FIG. 4 shows a specific illustrative embodiment of the level refreshing circuit 10. Referring to the figure, the gate of a transistor 23 is connected to the input terminal $I_{10}$ of the level refreshing circuit 10, and the input terminal $I_{10}$ is connected to the digit line 5. The source of the transistor 23 is grounded, while the drain is connected to the source of a transistor 24 and to the gate of a transistor 25. The reset pulse $\phi$ 1 is supplied to the respective gates of transistors 24 and 26, while the high potential $V_{DD}$ is supplied to the respective drains thereof. The drain of the transistor 25 is connected to the source of the transistor 26 and to the gate of a transistor 28. The source of the transistor 25 is connected to the drain of a transistor 27, whose source is grounded.

The gate of a transistor 29 and that of the transistor 25 are commonly connected in common. The transistor 29 has its source grounded, and has the drain thereof connected to the source of the transistor 28. The drain of the transistor 28 is connected to the source of a transistor 30. The drain of the transistor 30 is supplied with the high potential $V_{DD}$ volts. A capacitor 31 is connected between the drain of the transistor 29 and the gate of the transistor 28. The drain of the transistor 29 is connected through a transistor 32 and via the output terminal $O_{10}$ of the level refreshing circuit 10 to the digit line 5.

The "write" command signal $\phi$ 3 for activating the level refreshing circuit 10 is supplied to the respective gates of the transistors 27, 30 and 32. The control terminal 22 of the level refreshing circuit 10 is connected to the respective gates of transistors 33 and 34, the sources of which are both grounded. The drains of the transistors 33 and 34 are respectively connected to the gate of the transistor 29 and that of the transistor 28.

Since the level refreshing circuit 10 functions to refresh the information level in phase with the information level of the digit line 5, it has a construction corresponding to the cascade connection of two inverter stages. More specifically, the transistors 23 and 24 comprise the first-stage inverter, and the transistors 25 and 26 the second inverter stage. The transistors 28 and 29 constitute a buffer circuit for charging and discharging the capacitance of the digit line 5. When the reset pulse $\phi$ 1 is high, the "write" signal $\phi$ 3 is low, and, hence, the input terminals of the buffer circuit, namely, the gates of the transistors 28 and 29 are both high. Since the transistor 32 is "off" at this time, the level refreshing circuit is held inactive.

When the pulse $\phi$ 1 becomes the low level and the "read" signal $\phi$ 2 goes high, the information of the memory cell 1 is read out to the digit line 5. When the "write" signal $\phi$ 3 goes to the high level after the "read" signal $\phi$ 2 becomes high, the level refreshing circuit 10 is activated. Therefore, if the digit line 5 is at the high level, the gate level of the transistor 29 becomes low, whereas the gate of the transistor 28 maintains its high level. Accordingly, the output of the level refreshing circuit 10 becomes high. The capacitor 31 improves the capability of driving the digit line 5 in such manner that when the drain voltage of the transistor 29 is at the high level, the positive feedback by the capacitor 31 bring the output of the level refreshing circuit 10 to a sufficiently high level. Correspondingly, if the digit line 5 is low, the gate of the transistor 29 maintains its high level, whereas the gate of the transistor 28 becomes low. Accordingly, the output of the level refreshing circuit 10 assumes the low level.

In this manner, information in phase with the data on the digit line 5 is amplified by the level refreshing circuit 10, and fed back to the digit line 5. The transistors 33 and 34 having their gates connected to the control terminal 22 render the output of the level refreshing circuit 10 inactive during the presence of the control signal Z as has previously been described.

Figure 5:
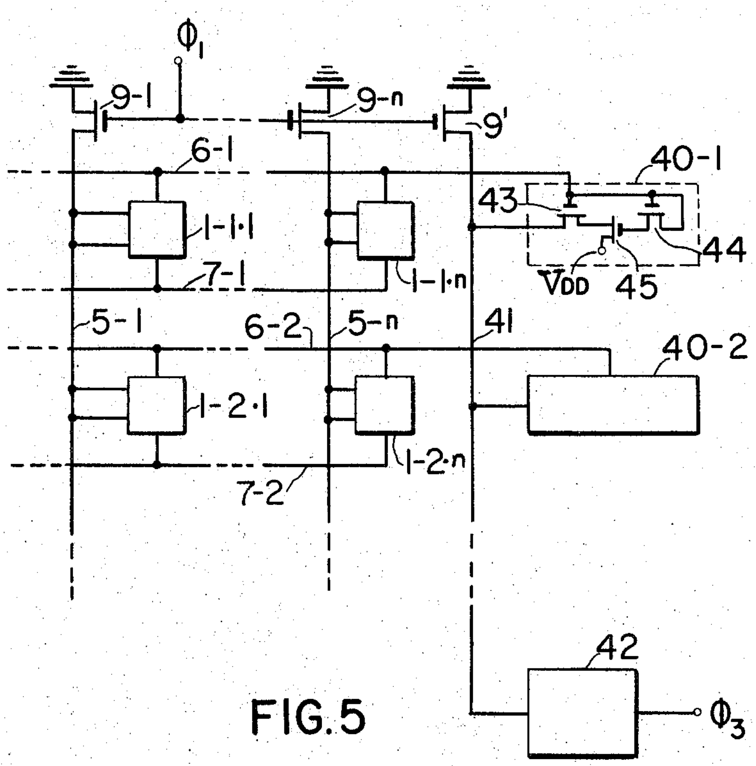
FIG. 5 is a diagram for presenting the principles for generating a "write" command signal "$\phi$ 3.

The "write" signal or the pulse activating the level refreshing circuit, $\phi$ 3 may comprise an external clock pulse. However, since it is convenient to decrease in the number of external clock pulses supplied to the memory circuit, the signal $\phi$ 3 is preferably generated by using the read command signal $\phi$ 2 within the memory circuit. In order to therefore generate the "write" signal $\phi$ 3 within the memory circuit, there may be employed, as illustrated in FIG. 5, pseudo memory cells 40 connected to the "read" word lines 6 at the respective rows of the memory matrix, a pseudo digit line 41 for commonly connecting all the outputs of these pseudo memory cells 40 in common, and a clock signal $\phi$ 3-generating circuit 42 connected to a pseudo digit line 41. In FIG. 5, memory cells 1–*m·n* are arranged to form a matrix of m-rows and n-columns as shown FIG. 3. Each pseudo memory cell 40–*i* is formed of transistors 43, 44 and 45. The gates of the transistors 43 and 44 and the drain of the transistor 44 are connected to the "read" word line 6–*i.* The source of the transistor 43 (the output terminal of the pseudo memory cell 40) is connected to the pseudo digit line 41 being supplied via a switching transistor 9′ with zero volts, while the drain is connected to the source of the transistor 45. The drain of the transistor 45 is supplied with the high potential $V_{DD}$ volts of the power supply, while the gate is connected to the source of the transistor 44. It is possible that the pseudo digit line 41 has the same capacitance as that of the digit line 5 in order that when the "read" signal $\phi$ 2 becomes high, the pseudo digit line 41 may be made high at a speed equal to that at which the digit line 5 is transfered to the high level.

With this is always at least one of the pseudo memory cells 40 is operated by a "read" signal $\phi$ 2, the high potential $V_{DD}$ being supplied to the pseudo digit line 41 through the transistors 43 and 45, and the psudo digit line 41 is driven to the high level. The high level signal read out to the pseudo digit line 41 drives the $\phi$ 3 generating circuit 42 to generate the "write" signal $\phi$ 3. In this case, the clock signal $\phi$ 3 may be generated when the level of the pseudo digit line 41 has exceeded the threshold voltage of the level refreshing circuit 10.

Figure 6:
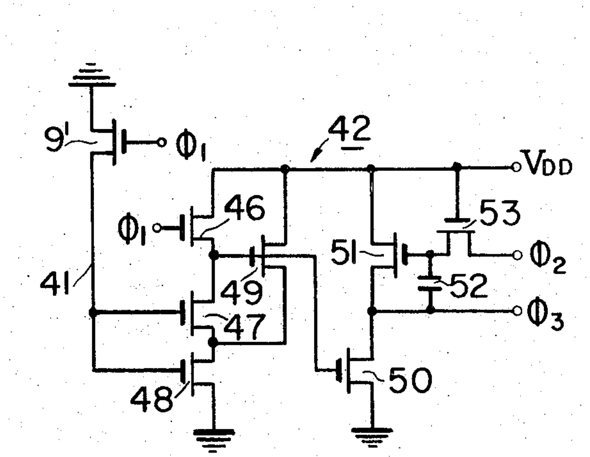
" and FIG. 6 and 7 are circuit diagrams each showing a concrete example of a "write" command signal "$\phi$ 3" generating circuit.

FIG. 6 is a diagram showing a specific illustrative implementation of the $\phi$ 3 generating circuit 42. It is required that when the signal of the pseudo digit line 41 becomes high, the clock signal $\phi$ 3 is generated, and it is necessary that the information of the pseudo digit line 41 and the clock signal $\phi$ 3 be in phase. Therefore, the $\phi$ 3 generating circuit 42 is constructed to two stages of inverter stages. The first inverter is formed of transistors 46, 47, 48 and 49, while the second inverter comprises transistors 50 and 51.

The transistor 48 has a grounded source, and has the gate connected to the pseudo digit line 41 and has the drain connected to the source of the transistor 47. The transistor 47 has its gate connected to the pseudo digit line 41, and the drain connected to the source of the transistor 46. The drain of the transistor 47 is further connected to the gate of the transistor 49 and to that of the transistor 50. The gate of the transistor 46 is supplied with the reset pulse $\phi$ 1, while the drain thereof is supplied with the high potential $V_{DD}$ volts of the power supply. The drain of the transistor 48 is further connected to the source of the transistor 49, whose drain is supplied with the high potential $V_{DD}$ volts.

The source of the transistor 50 is grounded. The drain of the transistor 50 is the output of the $\phi$ 3 generating circuit, and is connected to the source of the transistor 51 and to the gate of the transistor 51 through a capacitor 52. The drain of the transistor 51 is supplied with the voltage $V_{DD}$ volts, while the gate thereof is connected to the source of the transistor 53. The gate of the transistor 53 is supplied with the potential $V_{DD}$ volts, and the drain with the "read" signal $\phi$ 2.

The transistor 47 turns on when the first inverter begins to be driven by the high level signal of the pseudo digit line 41. In order to turn the transistor 47 on, the following relation should be given:

$$\begin{pmatrix}\text{Potential of}\\ \text{Pseudo}\\ \text{Digit Line}\end{pmatrix} - \begin{pmatrix}\text{Source}\\ \text{Potential of}\\ \text{Transistor 47}\end{pmatrix} > \begin{pmatrix}\text{Threshold}\\ \text{Voltage of}\\ \text{Transistor 47}\end{pmatrix}$$

It is accordingly possible that by varying the source potential of the transistor 47, the clock signal $\phi$3 is generated at a level higher than any desired voltage level of the pseudo digit line 41. The source potential of the transistor 47 can be arbitrarily determined by appropriately deciding the sizes of the transistors 48 and 49.

The capacitor 52 and the transistor 53 enhance the output driving capability of the $\phi$3 generating circuit 42 in a way such that charge is accumulated in the capacitor 52 by the "read" signal $\phi$2 to raise the gate potential of the transistor 51.

Figure 7:
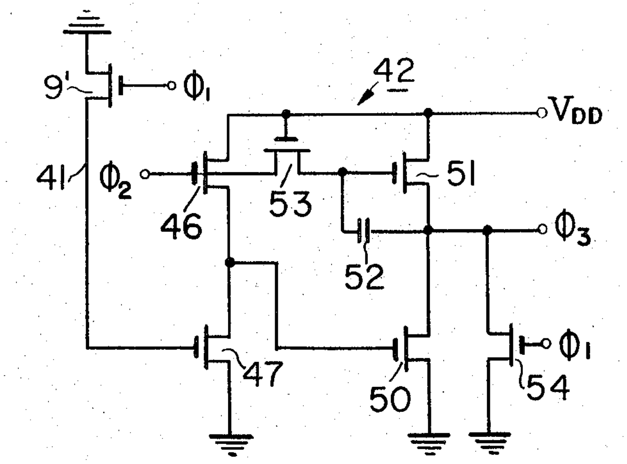

FIG. 7 is a diagram showing another specific example of the $\phi$3 generating circuit 42. In this example, the transistors 48 and 49 in FIG. 6 are omitted, and the gate of the transistor 46 is supplied with the "read" signal $\phi$2 instead of the reset pulse $\phi$1. An additional transistor 54 to be controlled by the reset pulse $\phi$1 is connected between the output terminal and the grounded terminal. According to the circuit of FIG. 7, the first inverter comprises transistors 46 and 47 while the second inverter is constituted of transistors 50 and 51.

With this circuit arrangement, the input threshold voltage of the $\phi$3 generating circuit can be appropriately determined by selecting appropriate sizes for the transistors forming the first and second inverters. Further, during the period during which the reset pulse $\phi$1 is at the high level, the clock signal $\phi$3 is clamped by the additional transistor 54 at the low level to make the operation of the $\phi$3 generating circuit 42 more reliable.

In accordance with the memory cell circuit of the present invention, the information in phase with the stored information in the memory cell can be read out to the common digit line. Therefore, as compared with the case of the prior-art memory cell circuit which reads out inverted information, the invention has the advantage that peripheral circuitry can be simplified. In addition, when an access command interrupts the refresh operation of the memory cell, a refresh operation may be terminated without destroying the stored information of the memory cell because of the phase in information being rewritten. It is thus possible to receive an access command at any time. Further, since the "read" command signal and the "write" command signal can be overlapped at the high level as illustrated in FIG. 2, it is unnecessary to make the "read" signal low and thereafter make the "write" signal high as is necessary in the prior art. This yields the advantages that the circuit arrangement can be simplified, and that noises attributed to the on-off operation of the clock signal are reduced.

MOS transistors employed for memory circuits are voltage-controlled elements and, in general, the signal level of the digit line is made sufficiently larger than the threshold voltage of the MOS transistor to permit high speed operation. In general, the signal level of the digit line is 10 volts, while the threshold voltage of the MOS transistor is 1 volt. Accordingly, with the prior-art memory circuit, unless the precharged digit line potential of 10 volts is discharged below 1 volt, the power amplifier transistor 21 will not effect proper operation. With the circuit of the present invention, however, the digit line is reset at O volt, and hence the transistor 21 operates by charging the digit line from O volt to above 1 volt. In this manner, the response voltage amplitude is far smaller in the circuit of the present invention. Accordingly, the transistors can respond at small voltage amplitude, so that access time can be reduced by the use of the memory circuit of the present invention.

It will thus be understood that variations to the specifically described embodiment of the invention may be made without necessarily departing from the spirit and scope of the invention.

What is claimed is:

1. A memory circuit having memory cells arranged in matrix form, a "read" word line and a "write" word line provided at each row of said matrix, a common digit line provided at each column of said matrix, and a power supply, each of said memory cells comprising first, second and third insulated-gate field effect transistors each having a control terminal, an input terminal and an output terminal, said output terminal of said first insulated-gate field effect transistor and said input terminal of said second insulated-gate field effect transistor being connected to said common digit line at the matrix column where said memory cell is located, said input terminal of said first insulated-gate field effect transistor being connected to one of said input and output terminals of said third insulated-gate field effect transistor, said control terminal of said first insulated-gate field effect transistor being connected to said "read" word line of the row with which said memory cell is associated, said output terminal of said second insulated-gate field effect transistor being connected to said control terminal of said third insulated-gate field effect transistor, said control terminal of said second insulated-gate field effect transistor being connected to said "write" word line at said row with which said memory cell is associated, the other of said input and output terminals of said third insulated-gate field effect transistor being connected to one terminal of said power supply, means connecting each of said common digit lines to the other terminal of said power supply, said one terminal of said power supply having a potential capable of rendering said insulated-gate field effect transistor conductive when applied to the control terminal thereof, wherein after said each common digit line is connected to said other terminal of said power supply and is subsequently disconnected therefrom, at least one of said "read" word lines is selected an information in phase with information stored in said memory cell coupled to the selected "read" word line is read out to said common digit line.

2. The memory circuit of claim 1, in which said insulated-gate field effect transistors are of the N-channel type, said one terminal of said power supply being characterized by a relatively high potential.

3. The memory cell circuit of claim 1, in which said insulated-gate field effect transistors are of the P-channel type, said one terminal of said power supply being characterized by a relatively low potential.

4. The memory circuit according to claim 1, further comprising a level refreshing circuit arranged at each matrix column and having first and second control terminals, an input terminal, and an output terminal, said input and output terminals of said level refreshing circuit being connected to said common digit line at the column with which said level refreshing circuit is associated, said first control terminal of said level refreshing circuit being connected to source means for supplying a first signal signifying the external read and write operational mode for said memory cell, said second control terminal of said level refreshing circuit being connected to source means for supplying a second signal signifying the selecting operation for said "write" word lines, wherein said level refreshing circuit does not operate when said second signal is not supplied to said second control terminal of said level refreshing circuit, while when said second signal is supplied to said second control terminal of said level refreshing circuit and said first signal is not supplied to said first control terminal of said level refreshing circuit, said level refreshing circuit amplifies said information of said common digit line as supplied from said input terminal of said level refreshing circuit and delivers the amplified information to said common digit line from said output terminal of said level refreshing circuit.

5. A memory circuit having memory cells arranged in matrix form, a "read" word line and a "write" word line provided at each row of said matrix, a common digit line provided at each column of said matrix, and a power supply, each of said memory cells comprising first, second and third insulated-gate field effect transistors, each having a control terminal, an input terminal and an output terminal, said output terminal of said first insulated-gate field effect transistor and said input terminal of said second insulated-gate field effect transistor being connected to said common digit line at the matrix column where said memory cell is located, said input terminal of said first insulated-gate field effect transistor being connected to one of said input and output terminals of said third insulated-gate field effect transistor, said control terminal of said first insulated-gate field effect transistor being connected to said "read" word line of the row with which said memory cell is associated, said output terminal of said second insulated-gate field effect transistor being connected to said control terminal of said third insulated-gate field effect transitor, said control terminal of said second insulated-gate field effect transistor being connected to said "write" word line at said row with which said memory cell is associated, the other of said input and output terminals of said third insulated-gate field effect transistor being connected to one terminal of said power supply, means connecting each of said common digit lines to the other terminal of said power supply, said one terminal of said power supply having a potential capable of rendering said insulated-gate field effect transistor conductive when applied to the control terminal thereof, further comprising switching means for selectively connecting each of said common digit lines to said other terminal of said power supply, and means for supplying a memory interrogating signal to at least one of said read lines.

* * * * *